United States Patent [19]
Poindexter et al.

[11] Patent Number: 6,121,602
[45] Date of Patent: Sep. 19, 2000

[54] METHOD FOR MONITORING FOAM AND GAS CARRY UNDER AND FOR CONTROLLING THE ADDITION OF FOAM INHIBITING CHEMICALS

[75] Inventors: Michael K. Poindexter, Sugar Land; Daniel H. Emmons, Rosenberg; Samuel C. Marsh; Michael C. Edwards, both of Houston, all of Tex.

[73] Assignee: Nalco/Exxon Energy Chemicals, L.P., Sugar Land, Tex.

[21] Appl. No.: 09/100,173

[22] Filed: Jun. 18, 1998

[51] Int. Cl.$^7$ ............................ G01N 11/00; G01N 27/00
[52] U.S. Cl. ...................... 250/214 R; 73/61.44
[58] Field of Search ............................ 250/214.1, 214 R, 250/227.11, 227.14, 577, 574, 573; 73/61.43, 61.44, 61.48, 61.61; 324/634, 635, 637, 639, 640, 662, 663, 664, 691, 693, 694, 696, 997, 698, 699, 702, 703

[56] References Cited

U.S. PATENT DOCUMENTS

| | | |
|---|---|---|
| 4,774,680 | 9/1988 | Agar . |
| 5,101,163 | 3/1992 | Agar ........................................ 324/639 |
| 5,101,367 | 3/1992 | Agar .................................... 364/551.01 |
| 5,260,667 | 11/1993 | Garcia-Golding et al. ............. 329/694 |
| 5,341,100 | 8/1994 | Taylor ...................................... 324/341 |
| 5,394,339 | 2/1995 | Jones ........................................ 364/510 |
| 5,417,107 | 5/1995 | Biencourt et al. ...................... 73/61.44 |
| 5,612,490 | 3/1997 | Carlson et al. . |

OTHER PUBLICATIONS

Brochure entitled: "Hydrocarbon/Water Measurement and Control of 100% Oil and Water Monitors and Interface Detectors", Agar Corporation, Sep. 1996.

*Primary Examiner*—John R Lee
*Attorney, Agent, or Firm*—Hill & Simpson

[57] ABSTRACT

Probes previously used only in polar systems are used to detect the presence of foam in nonpolar systems, such as hydrocarbon systems. The probes are used to detect the present of foam in high pressure separating equipment and to notify the operator of such equipment that a foaming condition exists. In response, the operator can either increase or decrease the amount of defoaming chemicals being added to the separator or the flowrate of the defoaming chemical is automatically changed to a predetermined flow rate. The probes may also be used to determine the amount of gas that is trapped or entrained in the crude oil.

15 Claims, 3 Drawing Sheets

METHOD FOR MONITORING FOAM AND GAS CARRY UNDER AND FOR CONTROLLING THE ADDITION OF FOAM INHIBITING CHEMICALS

BACKGROUND OF THE INVENTION

The present invention relates generally to the monitoring of foam and gas carry under and controlling the use of defoaming chemicals in hydrocarbon systems. Still more specifically, the present invention relates to the monitoring of foam in high pressure separators and controlling the addition of defoaming chemicals in high pressure separators.

Crude oil is typically produced with large volumes of gas and/or water suspended in the crude oil. Because mixtures of oil, gas and water have the tendency to separate into distinct phases, it is often advantageous to separate the oil, gas and water at the production cite before shipment to downstream processing sites. However, problems have evolved in the design and development of such production site separation equipment. Specifically, the separation of the oil, gas and water into separate phases often may not occur due to system turbulence or short resonance times of the fluids through existing process equipment.

A standard piece of equipment for separating oil, gas and water at the production site is a separator. Separators are typically large vessels that allow the fluids sufficient resonance time to separate into the different phases. However, one problem associated with such separators is foaming. The foam is generated by gas that has been entrained in the crude oil as well as gas that has dissolved in the crude oil. Often, foam can be created by pressure drops that occur as the crude oil enters the separator. As a result, liquified and dissolved gases are released causing a layer of foam to be formed on the crude oil surface.

The presence of the layer of foam on the crude oil surface or gas carry under below the surface creates significant operational problems. Specifically, oil will be lost as the gas and foam is removed from the separator. In addition to the loss of oil, the presence of oil in the gas stream will cause problems in measuring the amount of gas produced. Further, downstream gas compressor operations can also be adversely affected by the presence of liquid/foam in the gas. Specifically, vessels designed to handle primarily gas can become flooded with foam and/or liquid.

On the other hand, if foam is transported downstream with the crude oil, the presence of the gas with the oil will result in unexpected and unmanageable amounts of gas being released in downstream processing equipment. Unfortunately, the above-described foam-related problems are not recognized until the process has already been compromised.

As a result, there is a need for a method of determining if foaming or gas carry under is occurring in separators, such as high pressure separators, and other processing equipment. Such methods and equipment would enable the operator to quickly determine if a foaming or gas carry under problem exists and further allow the operator to adjust the amount of defoaming chemicals being added to the system accordingly. Such a system would enable the operator to reduce the amount of defoaming chemicals being added to the system when the foaming and/or gas carry under is under control or not present thereby improving the efficiency of the system.

SUMMARY OF THE INVENTION

A solution to the above-described problems are provided by the present invention which includes a method of monitoring and controlling the height of the layer of foam disposed on a top surface of a nonpolar liquid (such as crude oil or any other hydrocarbon stream) or the presence of gas below the surface (gas carry under) which comprises the steps of providing a probe comprising a transmitter and a receiver, disposing the transmitter above but in close proximity to the surface of the nonpolar liquid or below the surface of the nonpolar liquid, transmitting a predetermined signal from the transmitter towards the receiver, measuring a received signal at the receiver as energy absorbed, and determining whether foam or gas carry under is present based upon the predetermined signal, the received signal, and the position of the probe.

The inventors have found that when the transmitter and receiver are disposed immediately above the surface of the nonpolar liquid, the presence of foam on top of the liquid surface and between the transmitter and receiver increases signal transmission from the transmitter to the receiver in comparison with the amount of signal transmitted in the presence of air or gas. This increase in signal received enables one to determine whether foam is present based upon experimental data.

The inventors have also found that placing the transmitter and receiver below the surface of the liquid also yields reliable results in that the presence of gas in the liquid below the surface (gas carry under) reduces the ability of the probe to transmit the signal from the transmitter to the receiver. The reduction in the signal transmitted enables the operator to determine the oil to gas ratio.

In an embodiment, the transmitter comprises a probe tip.

In an embodiment, the probe tip comprises a distal end section made of metal and a middle section that is coated with a polymer.

In an embodiment, the polymer used to coat the middle section is polytetrafluoroethylene or any other non-conductive material.

In an embodiment, in the event the determined foam height is greater than a predetermined acceptable maximum height, the method further comprises adding at least one defoaming chemical to the nonpolar liquid.

In an embodiment, the method is practiced in a system wherein the nonpolar liquid is flowing through a vessel having an inlet and two outlets (one for the gas, the other for the liquid). In the event the detected foam height on the nonpolar liquid surface is greater than a predetermined acceptable height, the method further includes the step of adding at least one defoaming chemical to the vessel at a first flow rate and, in the event the calculated foam height falls below a predetermined acceptable minimum height, the method further includes the step of reducing the flow rate of the defoaming chemical to a second flow rate which is less than the first flow rate.

In an embodiment, the method of the present invention is practiced on a hydrocarbon system wherein foam is present on the top surface of a body of crude oil.

In an embodiment, the present invention is practiced in a hydrocarbon system wherein gas is trapped or contained within the liquid.

In an embodiment, the probe utilized in the method of the present invention is an Agar ID-201 or ID-202. Agar also manufactures other probe configurations which might prove suitable for the present application.

In an embodiment, the method of the present invention comprises a method of processing either wet or dry crude oil which comprises the steps of introducing a flow of crude oil into a separator vessel. The separator vessel has an outlet in communication with other downstream processing vessels. The separator vessel accommodates a probe which comprises a transmitter and a receiver. A layer of foam is disposed on top of the surface. The layer of foam has a foam height. The transmitter is disposed above but in close proximity to the surface of the oil or below the surface of the oil. The method further includes the steps of transmitting a predetermined signal from the probe tip towards the receiver, measuring a received signal at the receiver, detecting foam disposed on top of the surface based upon the difference between the predetermined signal and the received signal, and, in the event the calculated foam height is greater than a predetermined acceptable maximum height, adding at least one defoaming chemical to the separator at a first flow rate, and, in the event the calculated foam height falls below a predetermined acceptable minimum height, reducing the flow rate of defoaming chemical to a second flow rate which is less than the first flow rate.

In an embodiment, the method of the present invention includes the steps as set forth above but the problem is the presence of gas carry under, or gas dispersed below the oil's surface. Accordingly, the transmitter is disposed below the surface of the oil and the method includes the steps of transmitting a predetermined signal from the probe tip towards the receiver, measuring a received signal at the receiver, detecting the presence of gas carry under below the surface and, in the event the amount of gas carry under detected is greater than a predetermined acceptable maximum amount, adding at least one defoaming or degassing chemical to the vessel at a first flowrate, and, in the event the calculated amount of gas carry under falls below a predetermined acceptable minimum amount, reducing the flow rate of the defoaming or degassing chemical to a second flow rate which is less than the first flow rate.

In an embodiment, the present invention further comprises a probe for monitoring the height of a layer of foam disposed on top of a surface of nonpolar liquid. The probe comprises a transmitter and a receiver. The transmitter comprises a probe tip for transmitting a signal towards the receiver. The receiver comprises a sheath spaced radially outward from the probe tip with the sheath surrounding the probe tip. The sheath further comprises an inside diameter of about 16 mm for a probe tip having a diameter of 6 mm. However, other probe dimensions are applicable as well for different power levels and probe geometries.

In an embodiment, the probe further comprises a middle section disposed between the probe tip and a body. The middle section isolates the probe tip from the body. The middle section is coated with polytetrafluoroethylene or other non-conductive material.

In an embodiment, the present invention provides a probe for monitoring the height of a layer of foam comprising gas and oil disposed on top of a surface of liquid oil. The probe comprises a transmitter and a receiver. The transmitter comprises a probe tip for transmitting a signal towards the receiver.

It is an advantage of the present invention to utilize energy absorbing probe technology in the monitoring of foam in hydrocarbon systems.

Yet another advantage of the present invention is to provide an improved probe for the monitoring of foam in nonpolar liquid systems.

Another advantage of the present invention is to provide an improved probe for the monitoring of gas carry under in nonpolar liquid systems.

Still another advantage of the present invention is to provide an improved probe for the monitoring of foam in high pressure separators of production site processing equipment.

Still another advantage of the present invention is that it provides a means for determining the amount of gas trapped or entrained in crude oil at a production site.

Yet another advantage of the present invention is to provide an improved means for controlling the amount of defoaming chemicals being added to hydrocarbon systems and systems for treating nonpolar liquids.

Additional features and advantages of the present invention are described in, and will be apparent from, the detailed description of the presently preferred embodiments and from the figures.

DETAILED DESCRIPTION OF THE PRESENTLY PREFERRED EMBODIMENTS

Figure 1:
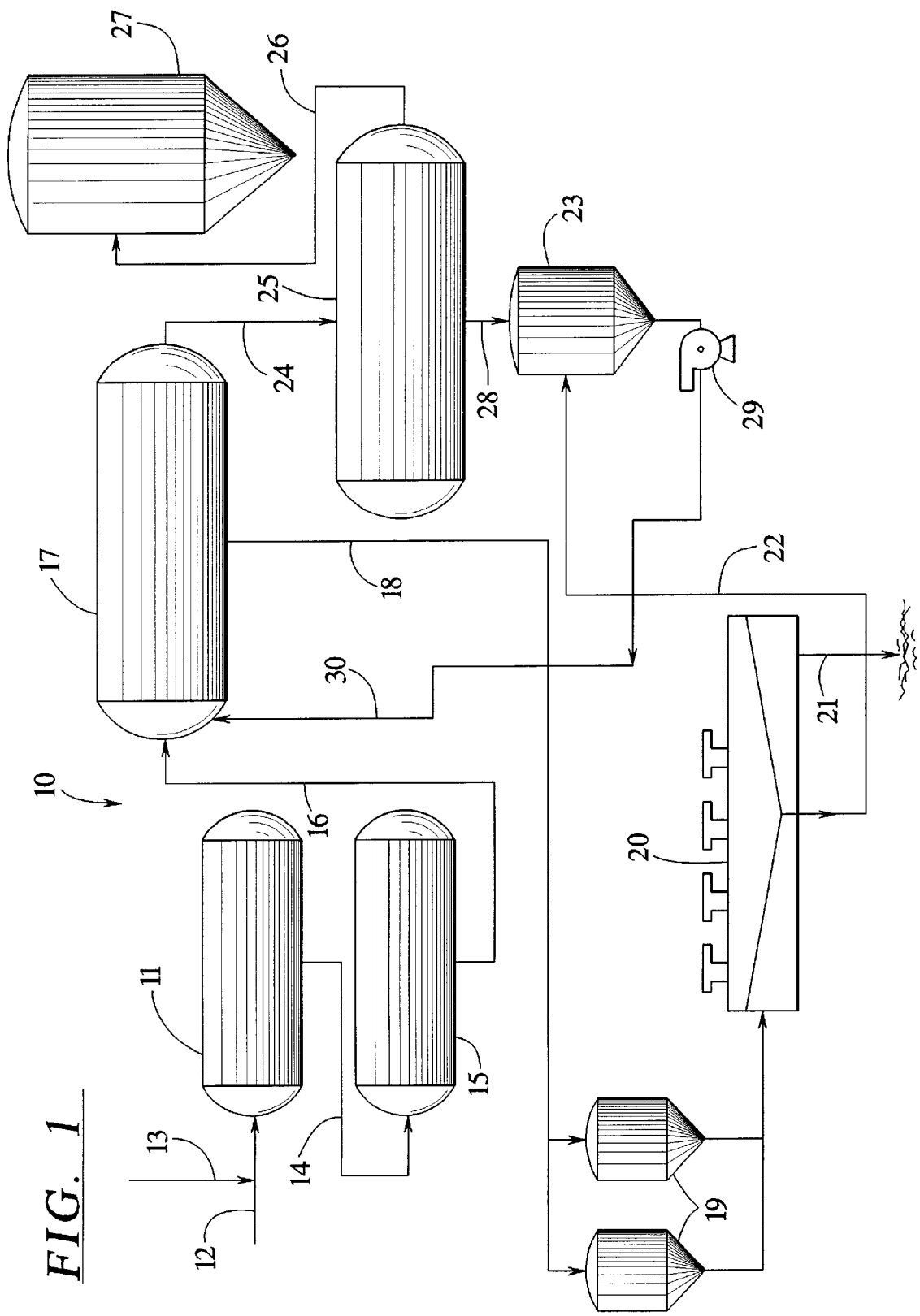
FIG. 1 illustrates, schematically, an oil/gas/water separating process in the form of an oil well platform or production site which is capable of incorporating the methods and apparatuses of the present invention.

The methods and apparatuses of the present invention can be utilized in an oil production system 10 as illustrated in FIG. 1 (which is one possible oil production configuration). Specifically, untreated crude oil, which contains gas (and possibly water) enters a high pressure separator 11 through line 12. At this point, defoaming chemicals and other treatment chemicals may be added to the oil through the line 13 or directly to separator 11. The oil is then transmitted through the line 14 to an intermediate pressure separator 15. From the intermediate pressure separator 15, the mixture of untreated crude oil and treatment chemicals flows through the line 16 to the free water knockout vessel 17. In the free water knockout vessel 17, water, if present, is drawn off the bottom of the vessel through the line 18 to the hydrocyclones shown at 19. Because the water transmitted through the line 18 still contains residual oil, the hydrocyclones 19 are utilized to further separate the water from the oil and then to create a foam layer disposed on top of the water in the gas floatation vessel 20 or "Wemco" 20. The treated water is dumped through the line 21 and the oil/gas mixture is transmitted through the line 22 to the wet oil tank 23.

Returning to the free water knockout vessel 17, as water is drawn through the line 18, once-treated oil which still contains some gas and possibly some water, is transmitted through the line 24 to the bulk oil treater 25. In the bulk oil treater, additional chemicals or heat is utilized to further remove water and gas to thereby provide dry oil which is transmitted through the line 26 to the dry oil tank 27. Wet oil is transmitted through the line 28 to the wet oil tank 23. The wet oil is pumped by the pump 29 through the line 30 back to the free water knockout 17 for further processing.

One appropriate placement for the probes utilized by present invention is the high pressure separator 11 which is the location where foaming would commence initially and which would provide the first indication to the operator that a foaming problem exists.

Figure 2:
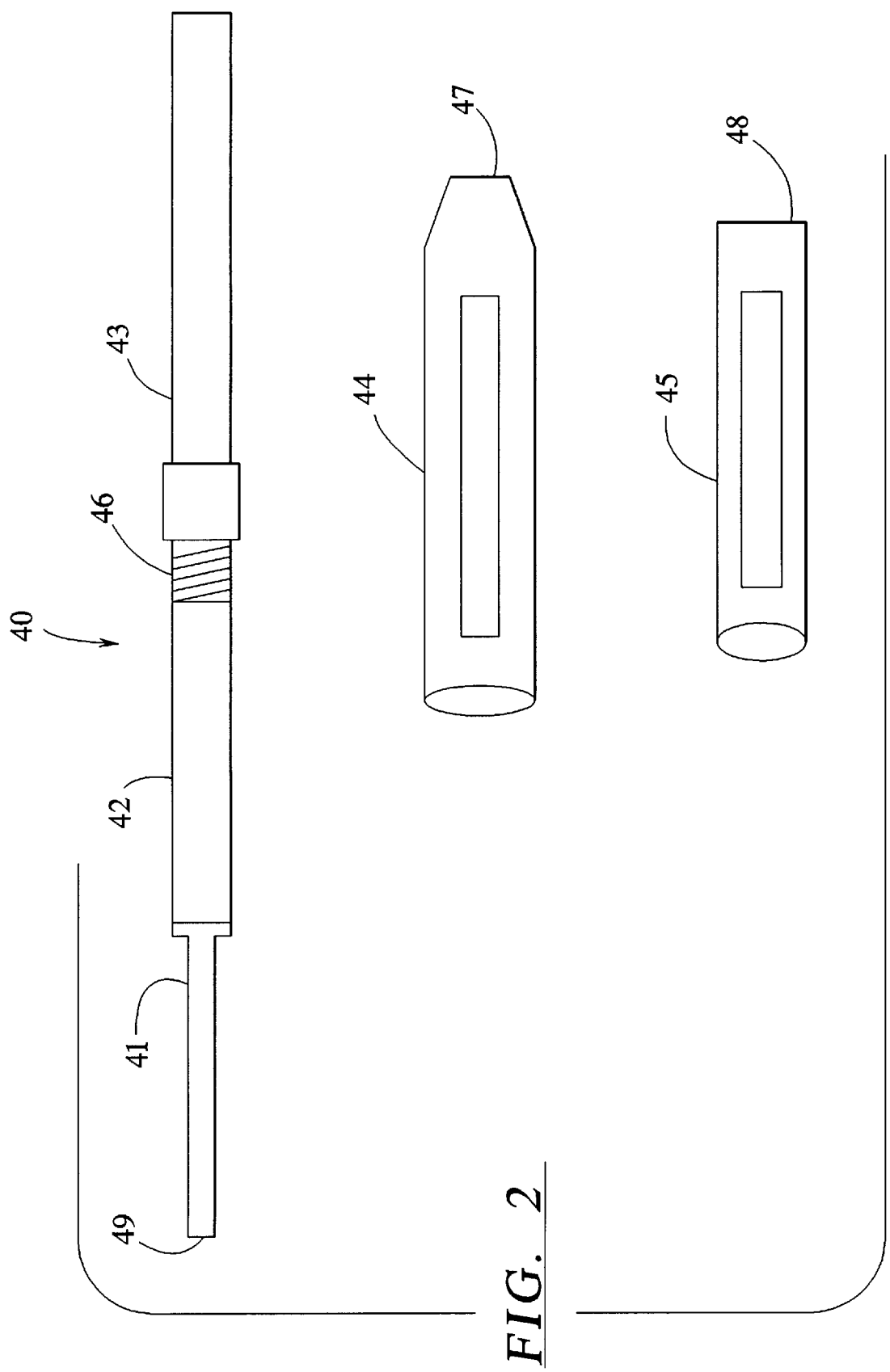
FIG. 2 illustrates, schematically, a probe for monitoring foam height made in accordance with the present invention with two sheaths of different sizes.

Turning to FIG. 2, a probe 40 made in accordance with the present invention is illustrated. The probe 40 includes a probe tip 41, which is fabricated from metal and serves the transmitter. A middle section 42 of the probe comprises metal coated with polytetrafluoroethylene or another suitable polymer or ceramic or non-conductive material. The middle section 42 connects the probe tip to a probe body 43 which is connected to a current source. Specifically, in a preferred embodiment, the probe utilized is sold by Agar Corporation of Houston, Tex. The preferred model number is ID-201 or ID-202. The probes are available with a variety of sheath sizes, two of which are shown at 44 and 45 in FIG. 2. For a probe tip 41 with a 6 mm diameter, the larger sheath 44 with an inside diameter of 28.5 mm has proven to be substantially less effective than the smaller sheath 45 with an inside diameter of 16 mm. The sheaths 44, 45 are mounted onto the probe 40 and are held in place by a threaded connection. Threads 46 are disposed between the middle section 42 and the body 43. Female threaded connections are provided at the inside ends 47, 48 at the sheaths 44, 45 respectively.

EXPERIMENTAL RESULTS

Figure 3:
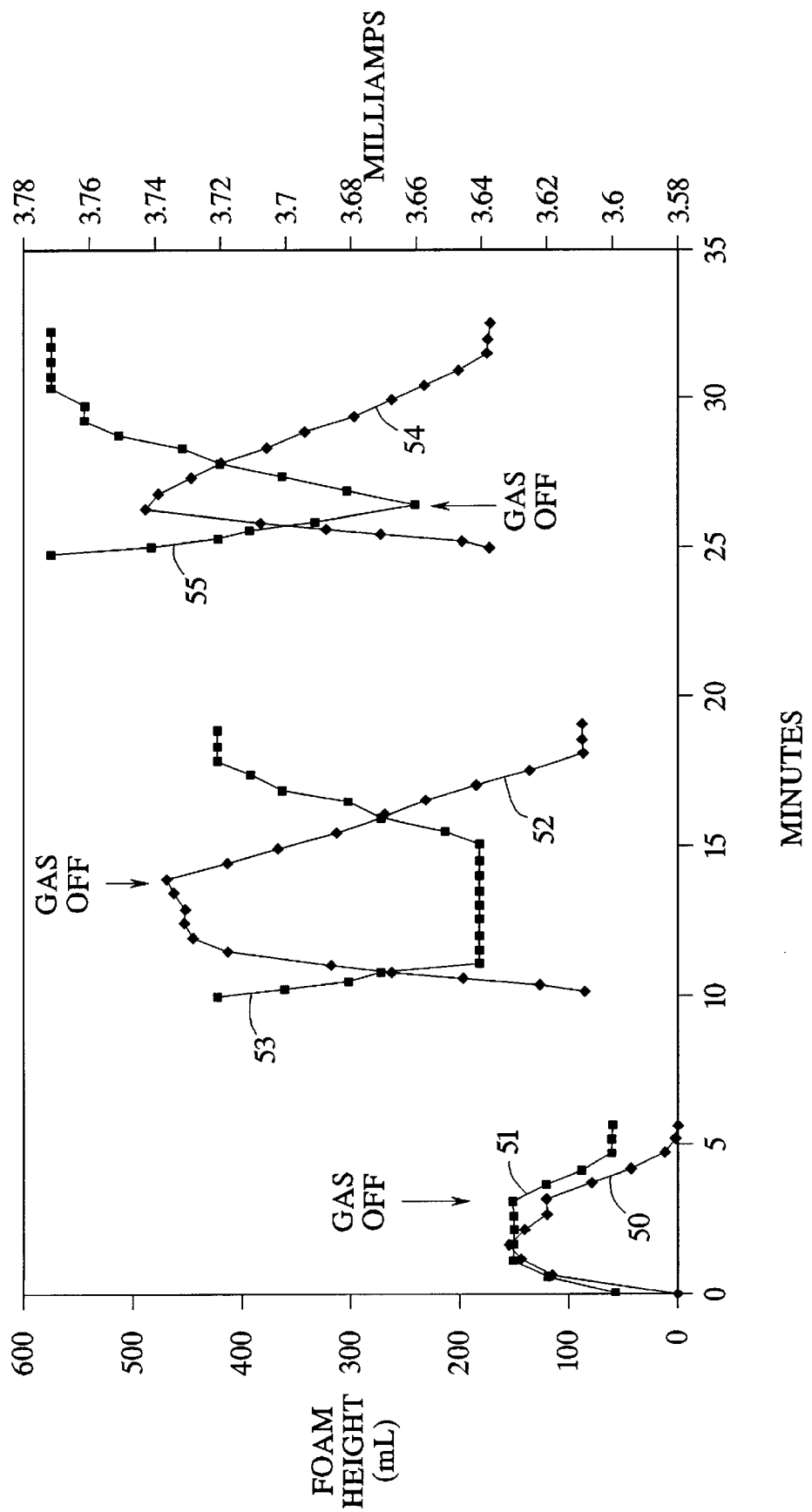
FIG. 3 illustrates, graphically, the signal transmitted from the transmitter or probe tip to the receiver or sheath in relation to the height of the foam layer.

The experimental results are illustrated in FIG. 3. The foam height is represented on the left y-axis; the signal received at the receiver, which produces a current, is represented at the right y-axis. The data illustrated in FIG. 3 represents the probe 40 in three different positions with respect to the surface of the untreated and dry crude oil.

Specifically, referring to the left portion of FIG. 3, the line 50 represents the foam height and the line 51 represents the amperage generated at the receiver. In this experiment, the distal end 49 of the probe 41 was disposed immediately above the surface of the oil. Nitrogen gas at 250 mL/min was sparged upward through the crude oil using a glass frit. Once the foam height had reached a maximum level, the gas was turned off and the foam was allowed to collapse. As shown in each case illustrated in FIG. 3, the amperage level at the beginning of the experiment (before the foam was generated) was the same as the amperage level at the end of the experiment after the foam collapsed. As a result, it can be concluded that small remaining droplets of hydrocarbon on the probe's surface did not affect the probe's ability to transmit current between the probe tip 41 and the sheath 45.

Turning to the middle portion of FIG. 3, the probe tip 41 was disposed below the surface of the untreated crude oil with the middle Teflon-coated section 42 disposed just above the surface of the oil. The line 52 represents the foam height and the line 53 represents the amperage generated at the sheath 45. Again, reproducibility is illustrated by the amperage level after the collapse of the foam returning to the same level as the amperage level at the beginning of the experiment.

Referring to the right side of FIG. 3, both the probe tip 41 and middle Teflon-coated section were disposed below the level of the untreated crude oil. The line 54 represents the foam height and the line 55 represents the amperage generated at the sheath 45. Again, the amperage level at the beginning of the experiment (before the sparging of the gas) is the same as the amperage level at the end of the experiment (after foam collapses).

Accordingly, the probe 40 may be disposed entirely above the surface of the oil, or partially submerged. Either way, the probe 40 provides an excellent indication of when a foaming problem or gas carry under condition exists thereby allowing the operator to either increase or decrease the defoaming chemicals being added through the line 13 as shown in FIG. 1 or through a line feeding directly into vessel 11.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A method of monitoring and controlling a height of a layer of foam disposed on a top of a surface of a nonpolar liquid as well as a presence of dispersed gas below the surface, the method comprising the following steps:

providing a probe comprising a transmitter and a receiver, disposing the transmitter and receiver above but in close proximity to the surface of the nonpolar liquid or below the surface of the liquid, transmitting a predetermined signal from the transmitter towards the receiver;

measuring a received signal at the receiver, determining the presence of foam disposed on top of the surface or the presence of gas dispersed below the surface based upon the difference between the predetermined signal and the received signal.

2. The method of claim 1 wherein the transmitter comprises a probe tip.

3. The method of claim 1 wherein the probe tip is isolated with a polymer coating.

4. The method of claim 1 further comprising the following step:

in the event foam is detected above the surface or dispersed gas is detected below the surface, adding at least one defoaming chemical to the nonpolar liquid.

5. The method of claim 1 wherein the nonpolar liquid is flowing through a vessel having an inlet and at least two outlets, the method further comprising the following steps:

in the event the presence of foam or dispersed gas is detected, adding at least one defoaming chemical to the vessel at a first flowrate, and in the event the presence of foam and dispersed gas is no longer detected, reducing the flowrate of defoaming chemical to a second flowrate which is less than the first flowrate.

6. A method of monitoring and controlling a height of a layer of foam disposed on top of a surface of oil or gas dispersed below the surface, the method comprising the following steps:

providing a probe comprising a transmitter and a receiver, disposing the transmitter above but in close proximity to the surface of the oil or below the surface of the oil, transmitting a predetermined signal from the probe tip towards the receiver, measuring a received signal at the receiver, detecting the presence of foam disposed on top of the surface or gas dispersed below the surface based upon the difference between the predetermined signal and the received signal.

7. The method of claim 6 wherein the transmitter comprises a probe tip.

8. The method of claim 6 wherein the probe tip is isolated with polytetrafluoroethylene.

9. The method of claim 6 wherein the probe is selected from the group consisting of Agar ID-201 and Agar ID-202.

10. The method of claim 6 further comprising the following steps:
   in the event the presence of foam or dispersed gas is detected, adding at least one defoaming chemical to the oil.

11. The method of claim 6 wherein the oil is flowing through a vessel having an inlet and at least two outlets, the method further comprising the following steps:
   in the event the presence of foam or dispersed gas is detected, adding at least one defoaming chemical to the vessel at a first flowrate, and
   in the event the presence of foam or dispersed gas is no longer detected, reducing the flowrate of the defoaming chemical to a second flowrate which is less than the first flowrate.

12. A method of monitoring and controlling a height of a layer of foam disposed on a top of a surface of a liquid as well as a presence of gas disposed below the surface, comprising the steps of:
   introducing a flow of oil into a separator vessel, the separator vessel outlets in communication with liquid and gas processing equipment, the separator vessel accommodating a probe comprising a transmitter and a receiver, the separator vessel accommodating a volume of the oil with a surface, the transmitter being disposed above but in close proximity to the surface or below the surface,
   transmitting a predetermined signal from the probe tip towards the receiver,
   measuring a received signal at the receiver,
   determining the presence of foam disposed on top of the surface or dispersed gas below the surface based upon the difference between the predetermined signal and the received signal,
   when the presence of foam or the presence of dispersed gas is detected, adding at least one defoaming chemical to the separator at a first flowrate, and
   in the event the presence of foam or dispersed gas is no longer detected, reducing the flowrate of defoaming chemical to a second flowrate which is less than the first flowrate.

13. The method of claim 12 wherein the transmitter comprises a probe tip.

14. The method of claim 12 wherein the probe tip is isolated with a polymer coating.

15. The method of claim 12 wherein the probe is selected from the group consisting of Agar ID-201 and Agar ID-202.

* * * * *